Aug. 18, 1964  G. S. ANDERSSON  3,144,741
SULKY HITCH
Filed July 16, 1963  2 Sheets-Sheet 1

Gosta S. Andersson
INVENTOR.

BY
Attorneys

Aug. 18, 1964  G. S. ANDERSSON  3,144,741
SULKY HITCH
Filed July 16, 1963  2 Sheets-Sheet 2
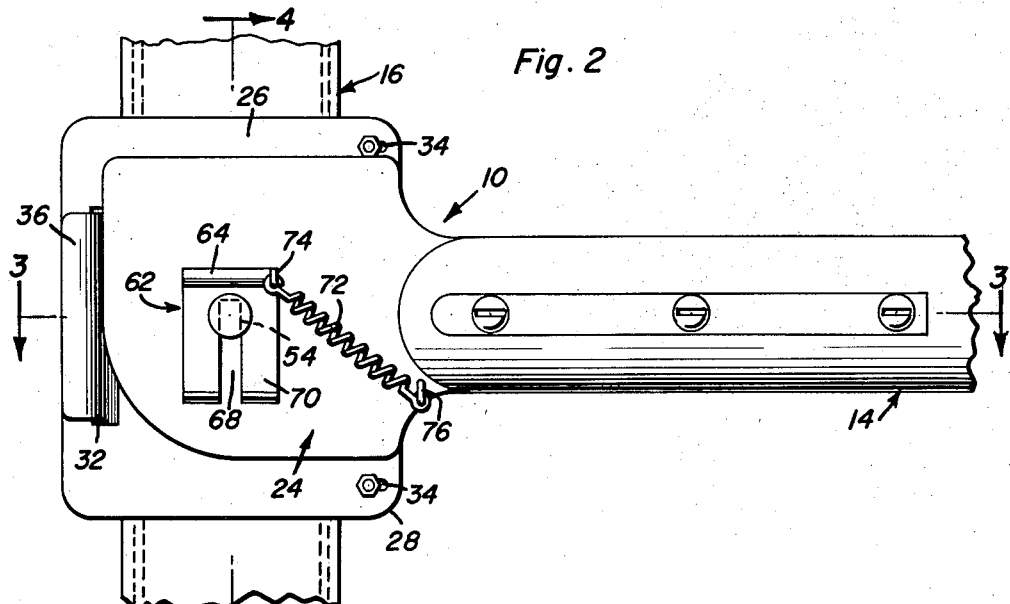
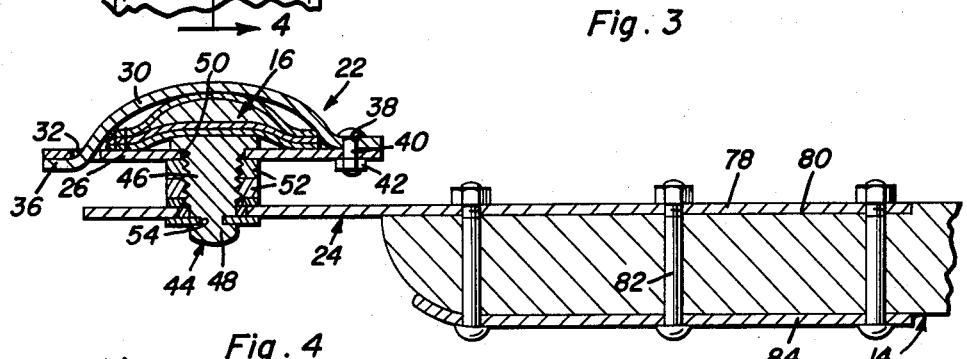
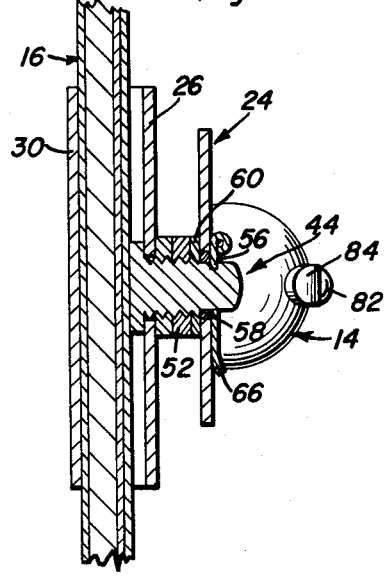
Gosta S. Andersson
INVENTOR.

3,144,741
SULKY HITCH
Gosta S. Andersson, P.O. Box 104, Upper Jay, N.Y.
Filed July 16, 1963, Ser. No. 295,314
8 Claims. (Cl. 54—23)

The instant invention is generally related to sulkies and is more particularly concerned with the provision of a novel hitch structure for releasably engaging the sulky shaft to the sulky saddle worn by the horse.

It is a primary intention of the instant invention to provide a unique means for securing the sulky shafts or thills to the animal drawing the sulky, in most instances a horse or pony, in a manner so as to eliminate many of the objectionable and potentially dangerous features of the more conventional types of securing means. For example, it is now conventional to attach the forward portions of the shaft to the animal in a rigid or substantially rigid manner with the extreme forward ends of the shaft projecting forwardly beyond the point of engagement, this, making their quick release extremely difficult. As a result, were the horse to accidentally fall or, through excitement rear upwardly and topple rearwardly toward the sulky, either the harness members or the shafts would necessarily have to break giving rise to the danger of either the horse or driver being impaled. In addition, the disengagement of the horse from the sulky caused by a rearward falling of the horse also gives rise to the possibility of the horse landing on top of the sulky causing extensive damage both to the equipment and the driver. Also, the animal, upon falling, even assuming no parting of the harness members or shafts, being excited could still cause extensive damage to both himself and the equipment before the more conventionally provided connecting means could be released.

In overcoming these above noted undesirable features, the instant invention contemplates the provision of both a rotatble and an easily released connector or hitch device between the forward ends of the shafts and the sulky saddle itself, this hitch means enabling the elimination of the normally provided forwardly projecting end on each shaft. By providing a rotatable connection, it will be appreciated that the horse can rear upwardly and even fall rearwardly or backwardly without the danger of the harness members or shafts breaking or snapping, this rotatable connection forming, in effect, the point of rotation of the horse relative to the sulky with the sulky always being maintained a fixed distance from this point.

The easily releasable feature mentioned is specifically intended so as to allow for either an automatic or manual release of the fallen animal with little or no difficulty and in an extremely rapid manner so as to avoid any damage to either the animal or the expensive equipment involved.

Another particular object of the instant invention is to provide a sulky hitch which, in addition to those particular advantages mentioned supra, also eliminates the necessity of much of the expensive leather equipment now required such as breast collars, traces, thimbles, false girth straps, and shaft tugs, the instant invention securing the shaft ends directly to the sulky saddle.

Also, it is intended that the sulky hitch of the instant invention be relatively simple in structure and capable of trouble free use over extended periods of time.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is an enlarged elevational view of the sulky hitch interconnecting the forward end of a shaft and a sulky saddle, the saddle and shaft being orientated somewhat in the manner illustrated in FIGURE 1;

FIGURE 3 is a cross sectional view taken substantially on a plane passing along line 3—3 in FIGURE 2;

FIGURE 4 is a cross-sectional view taken substantially on a plane passing along line 4—4 in FIGURE 2;

Figure 1:
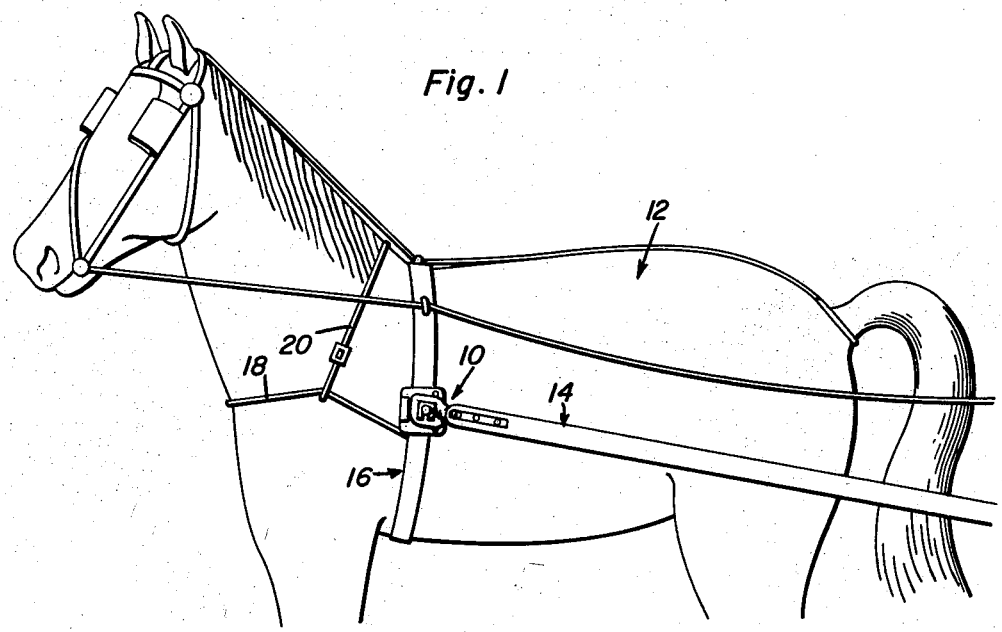
FIGURE 1 is a side elevational view of a horse to which a sulky is secured through the use of the hitch of the instant invention.

Referring now more specifically to the drawings, reference numeral 10 is used to generally designate the sulky hitch comprising the instant invention. This sulky hitch 10 is utilized, one being utilized on each side of the horse or animal 12, in securing the forward end of a sulky shaft or thill 14 directly to the sulky saddle 16 in both a rotatable and quickly releasable manner. The sulky saddle 16, as will be appreciated from FIGURE 1, is to be positioned forward of the longitudinal midpoint of the animal 12 whereby even a complete rearward rotation of the animal 12 will not bring the animal 12 into engagement with the sulky. Further, it is contemplated that the sulky saddle 16 itself forms the sole connection to the horse 12, however, if desired, a thin breast strap 18 and a suspender strap 20 can be provided.

The hitch 10 consists basically of a saddle plate unit 22, a shaft plate 24, and means interconnecting the plate unit 22 and plate 24.

The saddle plate unit 22 consists of a first flat rectangular plate 26 having rounded corners 28 and being positionable against the outer surface of the sulky saddle 16, and a second or inner plate 30 arcuately formed so as to span, in an engaging manner, the saddle 16 and interlock with the opposite ends of the outer flat plate 26. These plates 26 and 30 are to be interlocked in a manner so as to tightly clamp the saddle 16 therebetween and preventing any relative movement. In order to effect this locking of the plates 26 and 30, the plate 26 includes a vertically extending enlarged slot 32 adjacent the forward edge thereof and a pair of vertically spaced horizontal bolt receiving slots 34 adjacent the rear edge thereof. The plate 30 includes on its forward edge, a laterally projecting vertically extending tongue portion 36 received through the slot 32 in a manner so as to bear against the outer face of the plate 26 between the slot 32 and the forward edge of the plate 26. The plate 30 also includes, through the laterally projecting flat rear edge portion, a pair of bolt apertures 38 alignable with the bolt slots 34 in the plate 26. In mounting the plates 26 and 30 on the saddle 16, the plate 26 is positioned against the outer surface of the saddle 16, the tongue 36 is extended through the slot 32, the plate 30 is pivoted downwardly over the rear surface of the saddle 16, bolts 40 are inserted through the aligned apertures 38 and slots 34, and nuts 42 are tightened on the bolts 38 so as to draw the plates 26 and 30 into clamping engagement about the saddle 16, the projecting ends of the bolts 40 being cut off and the bolts 40 ball peened over the nut.

Extending outwardly from the saddle plate unit 22 is a stud 44 having a threaded intermediate portion 46 and an unthreaded outer portion 48. This stud 44, mounted on the plate 26 prior to the interlocking of the plate 30 thereto, extends through a centrally located aperture in the plate 26 and is rigidly locked thereto by a pair of lock nuts 52.

The unthreaded end portion 48 of the stud 44 includes, at a point spaced forward of the thread portion 46, two vertically extending keyways 54, a transversely extending keyway 56 communicating with the upper ends of the keyways 54.

The shaft plate 24, also generally rectangular in form though smaller in both length and width than the plate 26, includes a centrally located aperture therethrough within which a bearing 58 is fixed, the stud 44 being projected through the bearing and rotatably receiving the plate 24, a suitable washer 60 being mounted on the stud 44 between the lock nuts 52 and the plate 24. The plate 24 is retained on the stud 44 by means of a lock plate or member 62, this lock member 62 being generally flat and rectangular in shape with an outwardly curled upper end 64 and a slightly outwardly angled lower end 66. This member 62, as will be appreciated from the drawings, has an elongated slot 68 extending vertically from the lower end 66 thereof and in effect forming a bifurcated lower end, the slot 68 being of a width only slightly greater than the thickness of the stud 44 between the keyways 54 whereby the member 62 can be slid onto the stud 44 with the inner edges of the furcations 70 received within the opposed keyways 54 thus preventing removal of the plate 24 from the stud. If so desired, the member 62 can be slightly arched so as to tighten its engagement by pressing rsearwardly against the plate 24 and forwardly against the forward faces of the keyways 54.

Figure 5:
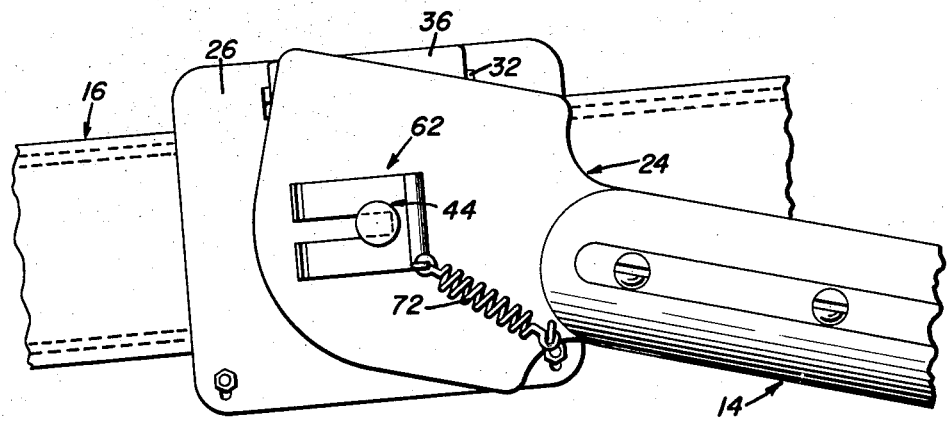
FIGURE 5 is an elevational view wherein the sulky saddle has been rotated rearwardly to a position wherein it is contemplated that the hitch will be automatically released.
Figure 6:
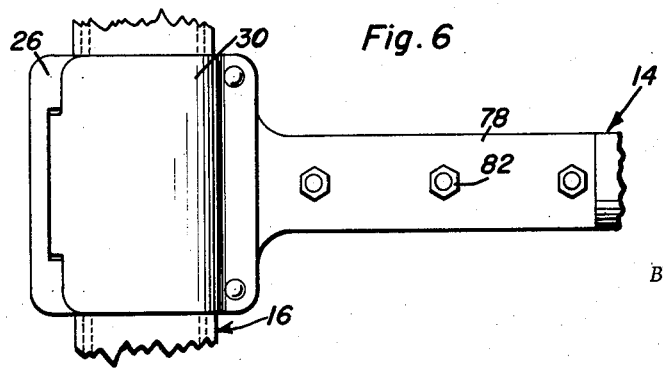
FIGURE 6 is a rear elevational view of the structure shown in FIGURE 2.

In order to effect an automatic release of the locking member 62, a tension spring 72 is engaged between the upper rear corner of the locking member 62 and a fixed point on the rear edge of the plate 24, suitable projecting hooks 74 and 76 being provided. As will be appreciated from a comparison of FIGURES 2 and 5, the spring means 72 is located so as to prevent any accidental disengagement of the locking member 62 in the normal relative position of the saddle 16 to the shaft 14 while at the same time providing for automatic release of the locking member 62 upon a rearward pivoting of the saddle 16 relative to the shaft 14 such as would occur upon the horse rearing and falling backward. Incidentally, it will also be appreciated that the particular structure of the locking member enables it to also be quickly released manually such as would be required if the horse 12 should fall sideways.

The shaft plate 24 is secured directly to the forward end portion of the shaft 14 by an integral rearwardly extending arm portion 78. The forward end of the shaft 14 is provided with a flattened portion 80 along the rear surface thereof against which the rearwardly extending arm 78 is flushly positioned and fixedly secured by transversely extending bolt means 82, the bolt means 82 extending completely through the forward end of the shaft and a suitable reinforcing strip 84 provided along the outer surface of the shaft 14. The extreme forward end of the shaft 14, as will be appreciated from the drawings, is rounded and terminates at approximately the rear edge of the plate 24, it being highly significant that the conventionally provided forward projection of the shaft is completely eliminated.

From the foregoing, it should now be appreciated that a highly unique sulky hitch has been described, this sulky hitch allowing for the quick, and in the event of a rearward tumbling of the horse, automatic disengagement of the horse from the sulky. In addition, by the provision of a rotatable connection between the sulky saddle and the shaft, the instant invention also overcomes the substantial danger, in the more conventional outfits, of the equipment breaking and the horse falling on the sulky or driver, this rotatable connection also eliminating the potentially dangerous normally provided forwardly projecting ends on the shaft.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a sulky hitch for releasably interlocking a sulky shaft with a sulky saddle, a saddle plate unit, a stud rigid with and projecting from said saddle plate unit, a shaft plate, said shaft plate being rotatably received on said projecting stud, and means for locking said shaft plate on said stud during an initial predetermined rotation of the saddle plate unit relative to the shaft plate.

2. The device of claim 1 including means for effecting a release of said locking means upon a predetermined rotation of the plate unit relative to the shaft plate.

3. The device of claim 2 wherein the plate unit includes two plates and means for interlocking these two saddle plates so as to effect a clamping of the sulky saddle therebetween.

4. The device of claim 3 wherein said shaft plate includes a laterally projecting arm positionable parallel to the extreme end portion of the sulky shaft, and means for fixedly securing said shaft to said arm.

5. The device of claim 4 wherein said stud includes parallel keyways adjacent the outer end and at aligned points on opposite sides thereof, said means for locking said shaft plate on said stud comprising a substantially flat member bifurcated at one end and having the furcations slidably received in the keyways.

6. The device of claim 5 wherein the means for effecting a release of the locking means consists of a spring means having one end fixed to the shaft plate and the opposite end fixed to the unibifurcated end of the flat member in a manner so as to effect an automatic withdrawal of the furcations from the keyways upon a rotation of the flat member toward alignment with spring means in order that a substantial portion of the biasing force of the spring means might be directed generally along the longitudinal axis of the flat member.

7. The device of claim 1 wherein said stud includes parallel keyways adjacent the outer end and at aligned points on opposite sides thereof, said means for locking said shaft plate on said stud comprising a substantially flat member bifurcated at one end and having the furcations slidably received in the keyways.

8. In a sulky hitch for releasably interlocking a sulky shaft with a sulky saddle, a saddle unit secured to said saddle, a shaft unit secured to said shaft, means for rotatably mounting said shaft unit on said saddle unit, and means for releasably fixing said units to each other during an initial predetermined rotation of the saddle unit relative to the shaft unit.

References Cited in the file of this patent

UNITED STATES PATENTS

| 934,304 | Gooing | Sept. 14, 1909 |
| 968,288 | Tank | Aug. 23, 1910 |
| 1,884,670 | Hanson | Oct. 25, 1932 |